(12) United States Patent
Huang et al.

(10) Patent No.: US 9,419,872 B2
(45) Date of Patent: Aug. 16, 2016

(54) METHOD, SYSTEM, AND APPARATUS FOR NODE STATUS DETECTION IN DISTRIBUTED SYSTEM

(71) Applicant: Tencent Technology (Shenzhen) Company Limited, Shenzhen (CN)

(72) Inventors: Mingsheng Huang, Shenzhen (CN); Bo Zeng, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 155 days.

(21) Appl. No.: 14/290,555

(22) Filed: May 29, 2014

(65) Prior Publication Data

US 2014/0269346 A1    Sep. 18, 2014

Related U.S. Application Data

(63) Continuation of application No. PCT/CN2013/074904, filed on Apr. 27, 2013.

(30) Foreign Application Priority Data

May 16, 2012   (CN) .......................... 2012 1 0151262

(51) Int. Cl.
*H04L 12/26*   (2006.01)
*H04L 29/06*   (2006.01)

(52) U.S. Cl.
CPC ............ *H04L 43/0817* (2013.01); *H04L 29/06* (2013.01); *H04L 43/0852* (2013.01); *H04L 43/16* (2013.01)

(58) Field of Classification Search
None
See application file for complete search history.

(56) References Cited

U.S. PATENT DOCUMENTS 5,631,935 A * 5/1997 Ginossar ................ H04L 47/10
  370/232
7,457,868 B1 * 11/2008 Guo .................... H04L 12/2602
  709/203

(Continued)

FOREIGN PATENT DOCUMENTS

| CN | 101577626 A | 11/2009 |
| CN | 101764838 A | 6/2010 |
| CN | 102025635 A | 4/2011 |

OTHER PUBLICATIONS

Chinese Office Action for Application No. 201210151262.9, dated Sep. 6, 2015.

(Continued)

*Primary Examiner* — Yemane Mesfin
*Assistant Examiner* — Peter Chen
(74) *Attorney, Agent, or Firm* — Patterson & Sheridan, LLP (57) ABSTRACT

Embodiments of the disclosure disclose a method, a system, and an apparatus for node status detection in a distributed system. The method includes: sending to each of multiple tested nodes a sequence of detection elements in order, and receiving responses returned from the multiple tested nodes in response to the receipt of the detection elements, calculating an average value of the detection elements each corresponding to the last response returned from the respective one of the multiple tested nodes at the end of a time period, as well as an absolute difference between the average value and the detection element corresponding to the last response returned from each of the multiple tested nodes at the end of the time period, and determining a tested node status based on whether the absolute difference corresponding to the tested node falls within a difference range.

17 Claims, 5 Drawing Sheets

(56) References Cited

U.S. PATENT DOCUMENTS

| | | | |
|---|---|---|---|
| 8,345,561 B2 * | 1/2013 | Edwards | H04L 43/0852 370/252 |
| 2004/0243335 A1 * | 12/2004 | Gunawardena | H04L 67/1002 702/116 |
| 2006/0045011 A1 * | 3/2006 | Aghvami | H04L 47/10 370/230 |
| 2009/0034479 A1 * | 2/2009 | Wakayama | H04L 45/16 370/332 |
| 2011/0231545 A1 | 9/2011 | Enomoto et al. | |
| 2012/0144018 A1 * | 6/2012 | Fried | H04L 12/6418 709/224 |

OTHER PUBLICATIONS

PCT Search Report for PCT/CN2013/074904 dated Aug. 8, 2013.

* cited by examiner

METHOD, SYSTEM, AND APPARATUS FOR NODE STATUS DETECTION IN DISTRIBUTED SYSTEM

CROSS REFERENCE TO RELATED APPLICATIONS

This application is a U.S. continuation application under 35 U.S.C. §111(a) claiming priority under 35 U.S.C. §§120 and 365(c) to International Application PCT/CN2013/074904 filed on Apr. 27, 2013, which claims the priority benefit of Chinese Patent Application No. 201210151262.9 filed on May 16, 2012, the contents of which are incorporated by reference herein in their entirety for all intended purposes.

FIELD OF THE INVENTION

The present invention relates to the field of network technologies, and in particular, to a method, system and apparatus for node status detection in a distributed system.

BACKGROUND

A distributed system is widely applied in existing networks. For example, a content delivery network (CDN) system is a typical distributed system. A distributed system consists of many network nodes. In actual applications, each network node in the distributed system needs to be monitored, for timely discovery of nodes in abnormal status, namely, abnormal nodes. Common causes of a network node status exception include abnormal network quality and abnormal node progress status. Currently, there are two common methods for detecting abnormal nodes. One is to detect abnormal nodes depending on the network quality, and the other is to detect abnormal nodes depending on the node progress status, which is described in the following.

When various data is transmitted over network medium using a network protocol such as TCP/IP, if the amount of information is too large, the excess network traffic will decrease the processing speed of a network node device, thereby causing network delay. Therefore, network delay is a typical index for evaluating network quality.

Currently, a typical method for detecting abnormal nodes in a distributed system depending on network quality is to send an Internet Control Message Protocol (ICMP) data packet to a tested network node, and detect the network quality of the node, according to information returned from the tested node for the ICMP data packet, such as network delay, and thereby discover an abnormal node.

Specifically, a fixed network delay threshold is currently preset. The network delay of a tested node is obtained by sending an ICMP data packet to the tested node, and the network delay is compared with the preset threshold. If the network delay is smaller than the threshold, the tested node is determined as a normal node; otherwise, the tested node is determined as an abnormal node.

According to the above solution, the method for detecting abnormal nodes in a distributed system by sending an ICMP data packet and presetting a fixed network delay threshold has the following disadvantage:

In the prior art, the preset threshold is fixed and cannot adapt to network changes. Therefore, when the network delay increases due to non-node factors such as overlarge data traffic on the entire network, abnormal node detection will present a lower accuracy.

For example, there are 1000 nodes, and at a specific point of time, the network delay of 999 nodes is 10 ms, and the network delay of the last node X is 1 s. If the preset detection threshold is 1 s, it is reported that the last node X is abnormal. In this case, the detection result is right.

However, if the network delay of 999 nodes reaches 1 s due to a certain unknown reason, such as overlarge data traffic on the entire network, and the network delay of the last node X reaches 10 s, an alarm indicating that the 1000 nodes are all abnormal is reported. Obviously, this detection result does not detect the actual abnormal node X with poorer network quality.

Therefore, the method for detecting abnormal nodes by setting a fixed threshold cannot detect whether a tested node is abnormal compared with other network nodes in the current network status, and the accuracy of abnormal node detection is low.

Moreover, in the distributed system, it often occurs that a data distribution path is restricted. For example, during data transmission from a source node A to a destination node C, although there are multiple paths from source node A to destination node C, data transmitted from source node A can reach destination node C only by a dedicated path. According to the current protocol, however, the ICMP data packet is free from path restraint, that is, the ICMP data packet may reach destination C by a path different from the data transmission path. Therefore, since the transmission path of ICMP data packet is different from data transmission path, the network delay acquired by sending an ICMP data packet cannot reflect the actual data transmission delay on a network, either. As a result, the detection result of abnormal node detection is not accurate.

SUMMARY OF THE INVENTION

In view of this, embodiments of the present invention provide a method, a system, and an apparatus for node status detection in a distributed system in order to improve the accuracy of node status detection.

A method for node status detection in a distributed system in accordance with an embodiment of the disclosure comprising: sending to each of multiple tested nodes a sequence of detection elements in order, and receiving responses returned from the multiple tested nodes in response of the receipt of the detection elements; calculating an average value of the detection elements each corresponding to the last responses returned from the respective one of the multiple tested nodes at the end of a time period, as well as an absolute difference between the average value and the detection element corresponding to the last response returned from each of the multiple tested nodes at the end of the time period; and determining a tested node status based on whether the absolute difference corresponding to the tested node falls within a difference range.

A system for node status detection in a distributed system includes a detection apparatus and multiple tested nodes.

The detection apparatus is configured to send to each of the multiple tested nodes a sequence of detection elements in order, receive responses returned from the multiple tested nodes in response to the receipt of the detection elements, calculate an average value of the detection elements each corresponding to the last response returned from the respective one of the multiple tested nodes at the end of a time period, as well as an absolute difference between the average value and the detection element corresponding to the last response returned from each of the multiple tested nodes at the end of the time period, and determine a tested node status based on whether the absolute difference corresponding to the tested node falls within a difference range.

Each of the multiple tested nodes is configured to receive a detection element sent from the detection apparatus, and return a response to the detection apparatus in response to the receipt of the detection element.

An apparatus for node status detection in a distributed system includes a detection sequence sending module, a response receiving module, an absolute difference calculating module, and a status determining module.

The detection sequence sending module is configured to send to each of multiple tested nodes a sequence of detection elements in order.

The response receiving module is configured to receive responses returned from the multiple tested nodes in response to the receipt of the detection elements.

The difference calculating module is configured to calculate an average value of the detection elements each corresponding to the last response returned from the respective one of the multiple tested nodes at the end of a time period, as well as an absolute difference between the average value and the detection element corresponding to the last response returned from each of the multiple tested nodes at the end of the time period.

The status determining module is configured to determine a tested node status based on whether the absolute difference corresponding to the tested node falls within a difference range.

It can be known from the above technical solutions that, in the present invention, a sequence of detection elements is sent to each of multiple tested nodes in order, and according to responses returned from the multiple tested nodes in response to the receipt of the detection element, an average value of the detection elements each corresponding to the response returned from the respective one of the multiple tested nodes at the end of a time period, as well as an absolute difference between the average value and the detection element corresponding to the last response returned from each of the multiple tested nodes at the end of the time period, are calculated. The above average value and absolute difference have their technical meanings Based on their technical meanings, a tested node status may be determined according to whether the absolute difference corresponding to the tested node falls within a difference range.

In the present invention, the absolute difference is dynamically obtained, that is, the absolute difference is obtained according to the average value of the detection elements each corresponding to last response returned from the respective one of the multiple tested nodes at the end of a time period, as well as the value of a detection element corresponding to the last response returned from a single tested node. Therefore, the absolute difference may reflect the quality difference between multiple tested nodes in the current network status, thereby measuring the relative status of a tested node accurately and improving the accuracy of node status detection.

DETAILED DESCRIPTION

According to embodiments of the present invention, a sequence of detection elements is sent to multiple tested nodes, so that the overall network status is evaluated according to responses returned from the multiple tested nodes, and the relative status of a single tested node is measured in the current overall network status according to an absolute difference between the response returned from the single tested node and the responses returned from the multiple tested nodes. Compared with the prior art in which abnormal nodes are detected by setting a fixed threshold, this solution improves the accuracy of node status detection.

Figure 1:
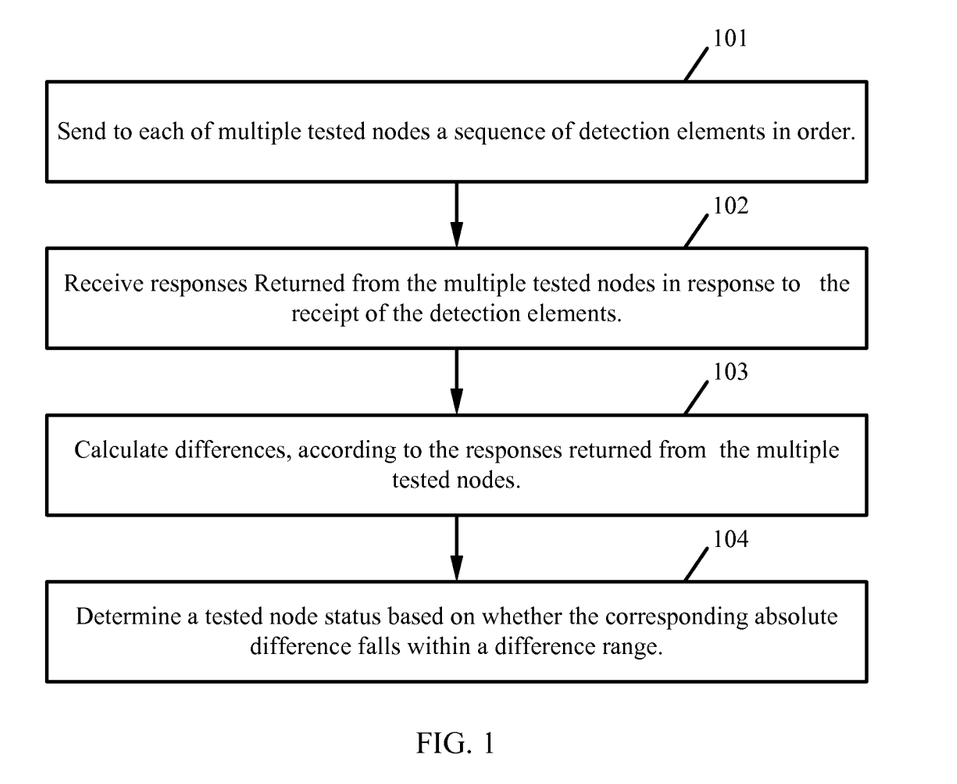
FIG. 1 is a flowchart of a method for node status detection in a distributed system according to an embodiment of the present invention.

FIG. 1 is a flowchart of a method for node status detection in a distributed system according to an embodiment of the present invention. As shown in FIG. 1, the process includes the following steps:

Step 101: Send to each of the multiple tested nodes a sequence of detection elements in order.

Step 102: Receive responses returned from the multiple tested nodes in response to the receipt of the detection elements.

Step 103: Calculate differences, according to the responses returned from the multiple tested nodes.

In step 103, calculate an average value of the detection elements each corresponding to the last responses returned from the respective one of multiple tested nodes at the end of a time period, as well as an absolute difference between the average value and the detection element corresponding to the last response returned from each one of the multiple tested nodes at the end of the time period. This difference can reflect the relative status of a single tested node in the current overall network status, for example, whether the tested node is abnormal compared with most other nodes.

Step 104: Determine a tested node status based on whether the absolute difference corresponding to the tested node falls within a difference range. A different difference range corresponds to different node status. The difference range may be determined according to a preset threshold used for node status classification.

There may be one threshold. It can be checked whether the absolute difference is greater than the threshold. If it is, it can be determined that the tested node corresponding to the absolute difference is abnormal; otherwise, it can be determined that the tested node corresponding to the absolute difference is normal.

Therefore, when only one threshold is set, abnormal nodes can be easily and quickly detected.

There may be two or more thresholds, so as to subdivide node states. When there are two or more thresholds, the method for determining an abnormal node is similar to the method used when there is one threshold. That is, the absolute difference is compared with the thresholds, and whether a node is abnormal is determined according to the comparison results, which is not described any further.

The sequence of detection elements in embodiments of the present invention may have different forms, for example, the sequence may be an ordered numeric sequence with a constant step, such as an arithmetic sequence (which may be an increasing sequence with a constant step or a decreasing sequence with a constant step), or an ordered alphabetic sequence with a constant step, such as a sequence of 26 letters ranging from a to z.

The average value may be an average value of the last received numbers each from the respective one of the multiple nodes at the end of the time period. The absolute difference is an absolute difference between the average value and the last received number from each of the multiple tested nodes at the end of the time period.

For ease of difference calculation, preferably, the response a tested node returns in response to the receipt of the detection element is the detection element itself.

To further simplify the difference calculation and expedite the network quality detection, preferably, an increasing sequence starting from 1 and with a step of 1 may be used as the detection sequence. The response the tested node returns in response to the receipt of the detection element is the detection element itself. The following gives more details according to specific examples. For details, see FIG. 2 to FIG. 5.

In the examples shown in FIG. 2 to FIG. 5, assume a server A and tested nodes B, C, and D are configured in a distributed system. The server A delivers an ordered numerical sequence with a constant step (in examples shown in FIG. 2 to FIG. 5, numbers in an increasing sequence starting from 1 and with a step of 1 are delivered in turn) to tested nodes B, C, and D in order. If any problem occurs when the server A sends a number to the tested node or receives a response returned from the tested node, it may be directly determined that the tested node is abnormal. If no problem occurs, the tested node directly returns the number to the server A in response to the receipt of the number from the server A. The server A only needs to collect the numbers lastly received from tested nodes B, C, and D within a period of time and obtain an average value, subtract the numbers lastly received from tested nodes B, C, and D respectively from the average value, and get an absolute value of the subtraction result to obtain a deviation. This deviation indicates the relative status of a corresponding tested node in the current network status. Therefore, the false report that may occur in abnormal node detection based on a fixed threshold in the prior art will not occur in abnormal node detection based on this deviation.

Figure 2:
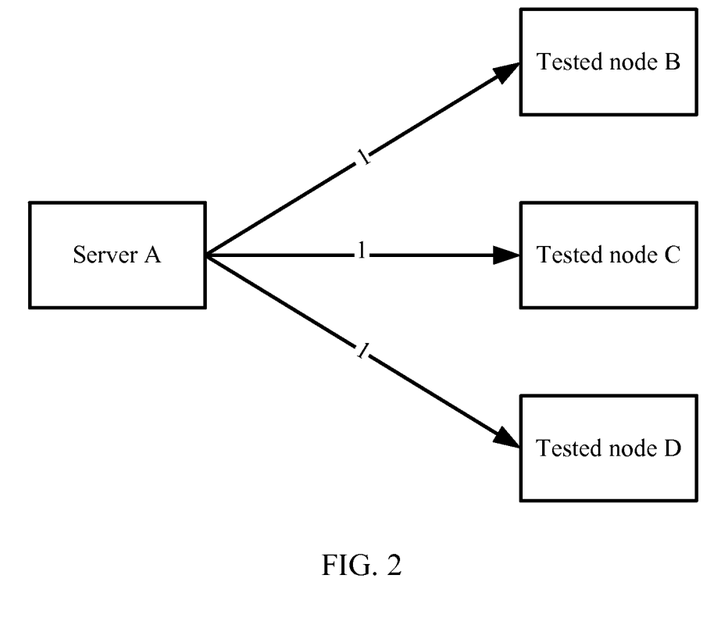
FIG. 2 is a first schematic diagram of a detection example according to an embodiment of the present invention.

FIG. 2 is the first schematic diagram of a detection example according to an embodiment of the present invention.

As shown in FIG. 2, server A sends each element in an increasing sequence that starts from the number 1 and increases with a step of 1 to tested nodes B, C, and D.

Figure 3:
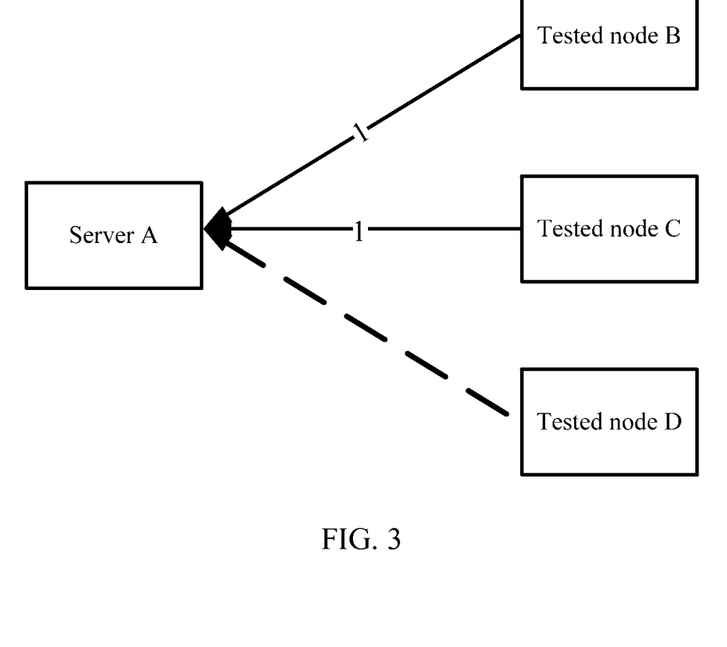
FIG. 3 is a second schematic diagram of a detection example according to an embodiment of the present invention.

FIG. 3 is the second schematic diagram of a detection example according to an embodiment of the present invention.

As shown in FIG. 3, after tested nodes B, C, and D receive a number from the server, they directly return the number to the server A. As shown in FIG. 3, tested nodes B and C have returned the number 1 to server A, but the tested node D did not returned the number 1 to server A in time because of the poor network quality or limited processing capacity.

Figure 4:
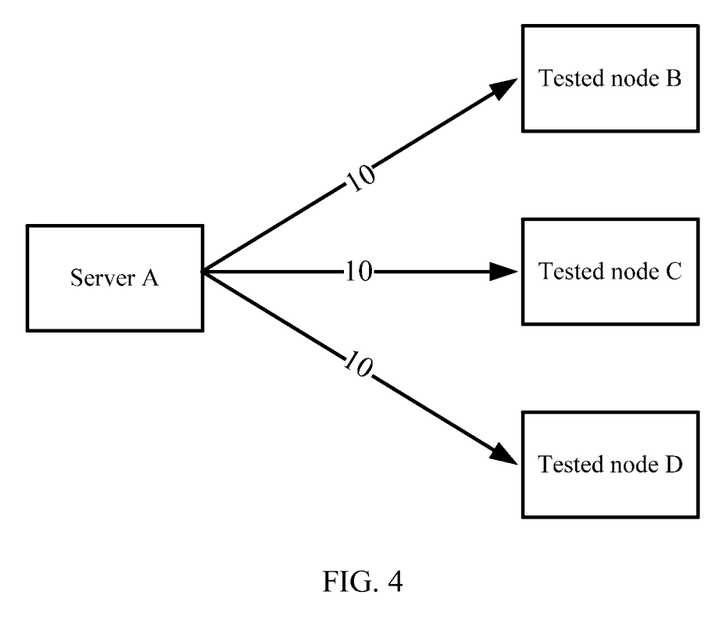
FIG. 4 is a third schematic diagram of a detection example according to an embodiment of the present invention.

FIG. 4 is the third schematic diagram of a detection example according to an embodiment of the present invention.

As shown in FIG. 4, in this detection example, server A has sent numbers 1 to 10 in sequence to tested nodes B, C, and D.

Figure 5:
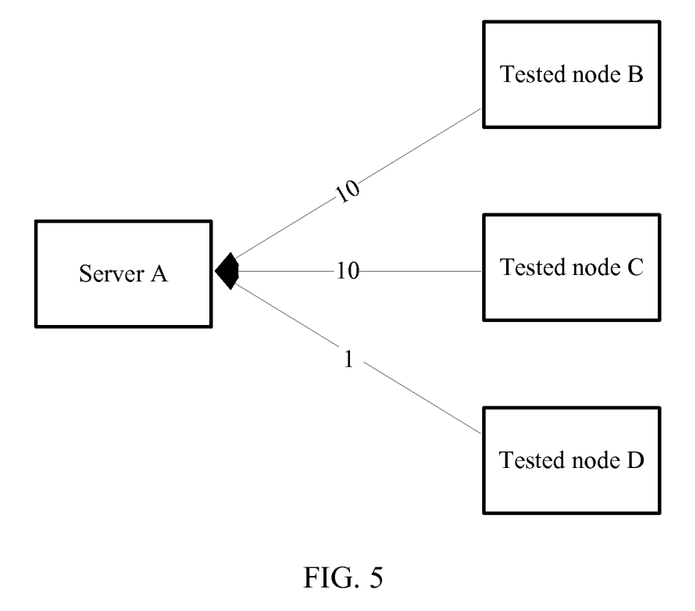
FIG. 5 is a fourth schematic diagram of a detection example according to an embodiment of the present invention.

FIG. 5 is the fourth schematic diagram of a detection example according to an embodiment of the present invention.

As shown in FIG. 5, tested nodes B and C have returned the number 10 to server A, but the tested node D has only returned the number 1 that failed to be returned to server A previously because of the poor network quality or limited processing capacity.

In the detection examples shown in FIG. 2 to FIG. 5, assume that the preset threshold is 5. The server A may obtain an average value 7 of the last numbers returned by tested nodes B, C, and D within a period shown in FIG. 2 to FIG. 5, namely, (10+10+1)/3. Then, the server A subtracts the last number returned by tested nodes B, C, and D from the average value 7 respectively, gets absolute values of the subtraction results, and compares the absolute values with the threshold 5. There are two scenarios:

For tested nodes B and C, |10−7|<5, so the network quality of tested nodes B and C is good.

For the tested node D, |1−7|>5, so the network quality of the tested node D is poor, and it may be determined that the tested node is abnormal.

According to the detection examples shown in FIG. 2 to FIG. 5, the following formulas may be concluded:

Assume that the last numbers returned by n tested nodes within a time period t are $s1, s2, \ldots, sn$, respectively. Then the average value is calculated as follows: average=$(s1+s2+\ldots+sn)/n$. A threshold may be set according to the actual node situation. And the last number returned by a tested node i within the time period t is si. Then:

In the case of |si−average|<threshold, the network quality of the tested node i is good.

In the case of |si−average|>=threshold, the network quality of the tested node i is poor, and the tested node i is abnormal.

Multiple thresholds may be set according to the actual node situation. For example, two thresholds, namely, threshold0 and threshold1, may be set, and threshold0 is smaller than threshold1. Then:

In the case of |si−average|<threshold0, the network quality of the tested node i is good.

In the case of |si−average|>=threshold0 & |si−average|<threshold1, the network quality of the tested node i is normal.

In the case of |si−average|>=threshold0, the network quality of the tested node i is poor.

Similarly, multiple thresholds may be set according to actual needs, which are not detailed any further.

Besides, technical solutions provided in embodiments of the present invention may be implemented at the application layer. In this case, according to the detection element lastly sent to a single tested node within a time period, as well as the detection element corresponding to the response returned from the single tested node at the end of the time period, the progress status of the single tested node may be accurately reflected.

For example, in detection examples shown in FIG. 2 to FIG. 5, it may also be determined that the progress status of the tested node D is abnormal.

The status of a node in embodiments of the present invention shows whether the node quality of this node is abnormal compared with the node quality of other nodes, namely, the relative status of the node quality. If the node quality of a node is abnormal, the network status or processing capability of the node may be abnormal.

Specifically, the average value and the difference have the following technical meanings. The average value of the detection elements each corresponding to the last response returned from the respective one of the multiple tested nodes at the end of a time period reflects the average quality of the multiple tested nodes, or the quality of most of the multiple tested nodes. The absolute difference reflects a deviation of the quality of a single tested node from the average quality or the quality of most tested nodes. Therefore, based on the difference range where the absolute difference falls in, the status of the tested node may be determined, for example, an abnormal node may be identified.

In embodiments of the present invention, the difference is dynamically obtained, that is, the difference is obtained according to the average value of detection elements corresponding to last response returned from the respective one of the multiple tested nodes at the end of a time period, as well as the value of a detection element corresponding to the last response returned from a single tested node at the end of the time period. Therefore, the absolute difference may reflect the quality difference between tested nodes in the current network status, thereby measuring the relative status of a tested node accurately and improving the accuracy of node status detection.

Therefore, by using the detection method provided in embodiments of the present invention, a relative status can be obtained according to the overall quality of the node being tested and the quality of each tested node. Moreover, in embodiments of the present invention, a sequence of detection elements is used for detection and the path of the sequence is the same as that of a common data packet, but the path of an ICMP packet is unnecessarily the same as that of a common data packet. Therefore, compared with an ICMP data packet, sending a sequence of detection elements may improve the detection accuracy. Besides, technical solutions provided in embodiments of the present invention do not require node indexes such as CPU usage, system invocation is not needed, thereby reducing computation overhead and detection costs.

According to the method provided in the embodiment of the present invention, embodiments of the present invention also provide a corresponding system and an apparatus. For details, see FIG. 6 and FIG. 7.

Figure 6:
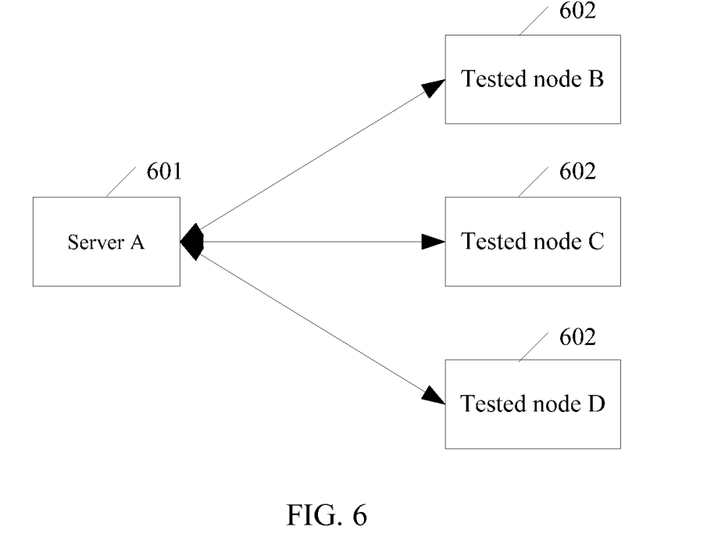
FIG. 6 is a structural schematic diagram of a system for node status detection in a distributed system according to an embodiment of the present invention.

FIG. 6 is a schematic structural diagram of a system for node status detection in a distributed system according to an embodiment of the present invention.

As shown in FIG. 6, the system includes a detecting apparatus 601 and multiple tested nodes 602.

The detection apparatus 601 is configured to send, to each tested node 602 a sequence of detection elements in order, receive responses returned from each tested node 602 in response to the receipt of the detection element, calculate an average value of the detection elements each corresponding to the last response returned from the respective one of the multiple tested nodes 602 at the end of a time period, as well as an absolute difference between the average value and the detection element corresponding to the last response returned from each tested node 602 at the end of the time period, and determine status of each tested node 602 based on whether the corresponding absolute difference falls within a difference range.

Each tested node 602 is configured to receive a detection element sent from the detection apparatus 601, and return a response to the detection apparatus 601 in response to the receipt of the detection element.

Different difference ranges correspond to different node statuses. The difference range may be determined according to a preset threshold used for node status classification.

Figure 7:
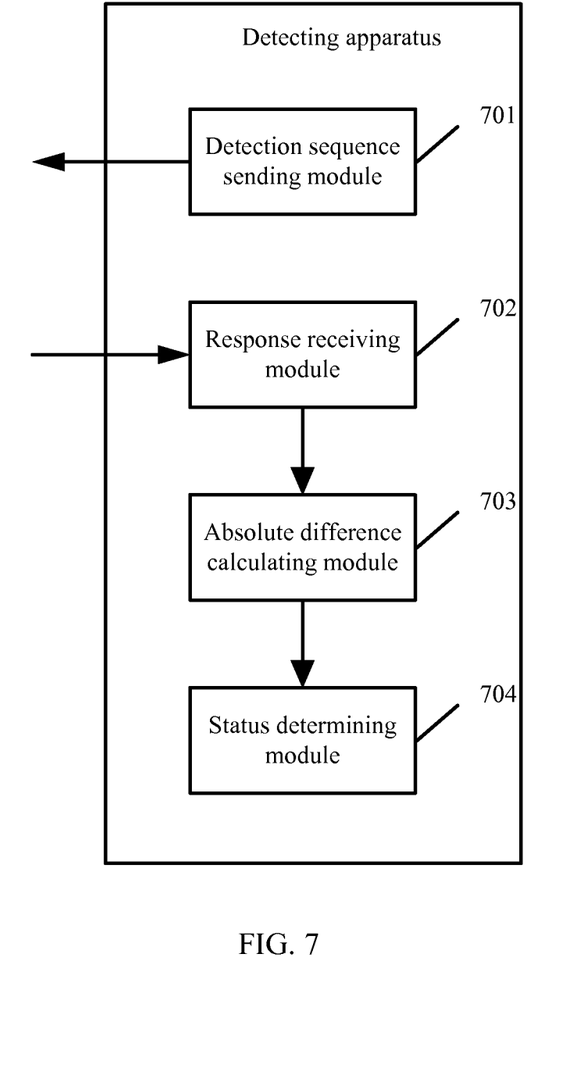
FIG. 7 is a structural schematic diagram of an apparatus for node status detection in a distributed system according to an embodiment of the present invention.

FIG. 7 is a schematic structural diagram of an apparatus for node network status detection in a distributed system according to an embodiment of the present invention.

As shown in FIG. 7, the apparatus includes a detection sequence sending module 701, a response receiving module 702, a difference calculating module 703, and a status determining module 704.

The detection sequence sending module 701 is configured to send to each of multiple tested nodes a sequence of detection elements in order.

The response receiving module 702 is configured to receive responses returned from the multiple tested nodes in response to the receipt of the detection elements.

The difference calculating module 703 is configured to calculate an average value of the detection elements each corresponding to the last responses returned from the respective one of the multiple tested nodes at the end of a time period, as well as a difference between the average value and the detection element corresponding to the last response returned from each of the multiple tested nodes at the end of the time period.

The status determining module 704 is configured to determine a tested node status based on whether the absolute difference corresponding to the tested node falls within a difference.

Different difference ranges correspond to different node statuses. The difference range may be determined according to a preset threshold used for node status classification.

There may be one or more thresholds. When there is one threshold, the status determining module is configured to check whether the absolute difference is greater than the threshold, and if so, determine that the tested node corresponding to the difference is abnormal.

The detection sequence is an ordered sequence with a constant step.

The detection sequence may specifically be an arithmetic sequence, for example, it may specifically be an increasing sequence starting from 1 and with a step of 1. The response to the receipt of a number may be the received number.

The average value may be an average value of the last received numbers each from the respective one of the multiple nodes at the end of the time period. The absolute difference is an absolute difference between the average value and the last received number from each of the multiple tested nodes at the end of the time period.

The essence of the technical solutions in embodiments of the present invention, or the part contributing to the prior art may be implemented in the form of a software product. The instruction set of the computer software product may be stored in a readable medium of the machine, such as, a floppy disk, a hard disk, or a compact disk. Several instructions containing the above method may be read and executed by the machine. The machine can be a terminal device (for example, a mobile phone, a personal computer, a server, or network equipment). When the instruction set is executed, the machine may perform the methods according to embodiments of the present invention. The implemented functions and technical effects are similar, which are not further described herein.

The foregoing descriptions are merely exemplary embodiments of the present invention, but not intended to limit the present invention. Any modification, equivalent replacement, or improvement made within the spirit and principle of the present invention shall fall within the protection scope of the present invention.

What is claimed is:

1. A method for node status detection in a distributed system, comprising:

sending to each of multiple tested nodes a sequence of detection elements in order, and receiving responses returned from the multiple tested nodes in response to the receipt of the detection elements;

calculating an average sequence number of the detection elements each corresponding to the last response returned from the respective one of the multiple tested nodes at the end of a time period, as well as an absolute difference between the average sequence number and the detection element corresponding to the last response returned from each of the multiple tested nodes at the end of the time period; and determining a tested node status based on whether the absolute difference corresponding to the tested node falls within a difference range.

2. The method according to claim 1, wherein a different difference range corresponds to a different node status, the difference range being determined according to a preset threshold used for node status classification classifying node statuses.

3. The method according to claim 1, wherein there is one or more thresholds.

4. The method according to claim 1, wherein the sequence is an ordered sequence with a constant step.

5. The method according to claim 4, wherein the sequence is an arithmetic sequence and a received number is returned as the response to the receipt of the number.

6. The method according to claim 4, wherein the average sequence number is an average value of the last received numbers each from the respective one of the multiple tested nodes at the end of the time period, and the absolute difference is an absolute difference between the average value and the last received number from each of the multiple tested node at the end of the time period.

7. A system for node status detection in a distributed system, comprising a server and multiple tested nodes, wherein:

the server is configured to send to each of the multiple tested nodes a sequence of detection elements in order, receive responses returned from the multiple tested nodes in response to the receipt of the detection elements, calculate an average sequence number of the detection elements each corresponding to the last response returned from the respective one of the multiple tested nodes at the end of a time period, as well as an absolute difference between the average sequence number and the detection element corresponding to the last response returned from each of the multiple tested nodes at the end of the time period, and determine a tested node status based on whether the absolute difference corresponding to the tested node falls within a difference range; and each of the multiple tested nodes is configured to receive a detection element sent from the server, and return a response to the server in response to the receipt of the detection element.

8. An apparatus for node status detection in a distributed system, comprising a transmitter, configured to send to each of multiple tested nodes a sequence of detection elements in order;

a receiver, configured to receive responses returned from the multiple tested nodes in response to the receipt of the detection elements; and a processor, configured to:

calculate an average sequence number of the detection elements each corresponding to the last response returned from the respective one of the multiple tested nodes at the end of a time period, as well as an absolute difference between the average sequence number and the detection element corresponding to the last response returned from each of the multiple tested nodes at the end of the time period; and determine a tested node status based on whether the absolute difference corresponding to the tested node falls within a difference range.

9. The apparatus according to claim 8, wherein a different difference range corresponds to different node status, the difference range being determined according to a preset threshold used for classifying node statuses.

10. The apparatus according to claim 8, wherein there is one or more thresholds.

11. The apparatus according to claim 8, wherein, the sequence is an ordered sequence with a constant step.

12. The apparatus according to claim 11, wherein the sequence is an arithmetic sequence and a received number is returned as the response to the receipt of the number.

13. The apparatus according to claim 11, wherein the average sequence number is an average value of the last received numbers each from the respective one of the multiple tested nodes at the end of the time period, and the absolute difference is an absolute difference between the average value and the last received number from each of the multiple tested nodes at the end of the time period.

14. The method according to claim 2, wherein there is one or more thresholds.

15. The method according to claim 2, wherein the sequence is an ordered sequence with a constant step.

16. The apparatus according to claim 9, wherein there is one or more thresholds.

17. The apparatus according to claim 9, wherein, the sequence is an ordered sequence with a constant step.

* * * * *